(12) United States Patent
Saito

(10) Patent No.: US 7,387,254 B2
(45) Date of Patent: Jun. 17, 2008

(54) INFORMATION PROCESSING SYSTEM AND METHOD, INFORMATION PROCESSING APPARATUS AND METHOD, AND PROGRAM

(75) Inventor: Mari Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 441 days.

(21) Appl. No.: 11/134,832

(22) Filed: May 19, 2005

(65) Prior Publication Data

US 2005/0262043 A1    Nov. 24, 2005

(30) Foreign Application Priority Data

May 20, 2004  (JP)  ............................ P2004-150817

(51) Int. Cl.
*G06K 7/10* (2006.01)
(52) U.S. Cl. ................................. 235/472.01; 235/375
(58) Field of Classification Search ........... 235/472.01, 235/375
See application file for complete search history.

(56) References Cited

U.S. PATENT DOCUMENTS 7,007,008 B2 *  2/2006  Goel et al. ..................... 707/3

FOREIGN PATENT DOCUMENTS

| JP | 2002-109371 | 4/2002 |
|----|-------------|--------|
| JP | 03/083723 | 10/2003 |

* cited by examiner

*Primary Examiner*—Karl D. Frech
(74) *Attorney, Agent, or Firm*—Bell, Boyd & Lloyd LLP

(57) ABSTRACT

An information processing system and method, information processing apparatus and method, and program is provided. A user profile memory of a client (user terminal) stores a user profile representing a history of contents that have been operated in the past by the user. If the user profile is to be transmitted to a server, a profile processor processes at least part of the user profile according to a predetermined rule, and transmits the processed information as a processed user profile to the server via a communication controller and a network. The server performs a process of determining contents to be recommended to the user based on the processed user profile. The present invention is applicable to a client (user terminal) that can be used by the user.

11 Claims, 3 Drawing Sheets

INFORMATION PROCESSING SYSTEM AND METHOD, INFORMATION PROCESSING APPARATUS AND METHOD, AND PROGRAM

CROSS REFERENCE TO RELATED APPLICATION

This application claims priority to Japanese Patent Document No. 2004-150817, filed on May 20, 2004 with the Japanese Patent Office, which disclosure in its entirety is hereby incorporated by reference.

BACKGROUND OF THE INVENTION

The present invention relates to an information processing system and method, an information processing apparatus and method, and a program, and more particularly to an information processing system and method, an information processing apparatus and method, and a program which are capable of transmitting a user profile confidentially to a server with a simple operation.

Recently, there have emerged servers for acquiring user profiles from user terminals via communications and performing various processing sequences, e.g., recommending information matching the preferences of users, using the acquired user profiles.

User profiles transmitted to such servers are private information of the users, and need to be protected in some ways. Japanese Patent Laid-open No. 2002-109371 discloses a process for providing a scheme for protecting a user profile and allowing the user to select private information that can be given away to a server.

However, the disclosed process for protecting a user profile requires the user to perform a tedious and time-consuming procedure for making settings or registering user's information for particular services each time user's information is to be protected.

A process that does not require the user to use such particular services, but performs a corresponding function at the sender is provided in Japanese patent application No. 2002-095414. However, even if this process is employed, the user still needs to make settings by themselves. Therefore, the disclosed process fails to fully solve the above problems.

SUMMARY OF THE INVENTION

The present invention relates to an information processing system and method, an information processing apparatus and method, and a program, and more particularly to an information processing system and method, an information processing apparatus and method, and a program which are capable of transmitting a user profile confidentially to a server with a simple operation.

The present invention in an embodiment permits a user profile to be transmitted confidentially to a server with a simple operation.

According to the present invention, there is provided in an embodiment an information processing system including a first information processing apparatus usable by a user, and a second information processing apparatus, the first information processing apparatus and the second information processing apparatus being capable of communicating with each other, the first information processing apparatus including a memory unit for storing history information representing a history of a plurality of contents which have been operated in the past by the user, a processing unit for processing at least part of the history information stored in the memory unit according to a predetermined rule, and outputting processed history information, and a first communicating unit for transmitting the processed history information output from the processing unit to the second information processing apparatus, the second information processing apparatus including a second communicating unit for receiving the processed history information transmitted from the first information processing apparatus, a determining unit for determining one or more candidates for contents to be recommended to the user based on the processed history information received by the second communicating unit, and a list generating unit for generating a list of information which identifies each of the one or more candidates for contents which are determined by the determining unit, wherein the second communicating unit transmits the list generated by the list generating unit to the first information processing apparatus, and the first communicating unit receives the list transmitted from the second information processing apparatus.

According to the present invention in an embodiment, there is also provided a method of processing information in an information processing system including a first information processing apparatus usable by a user and a second information processing apparatus, the first information processing apparatus and the second information processing apparatus being capable of communicating with each other, the method including the steps of processing at least part of history information representing a history of a plurality of contents which have been operated in the past by the user, according to a predetermined rule in the first information processing apparatus, and transmitting the processed history information from the first information processing apparatus to the second information processing apparatus, receiving the processed history information from the first information processing apparatus in the second information processing apparatus, determining one or more candidates for contents to be recommended to the user based on the processed history information in the second information processing apparatus, generating a list of information which identifies each of the one or more candidates for contents in the second information processing apparatus, and transmitting the generated list from the second information processing apparatus to the first information processing apparatus, and receiving the list from the second information processing apparatus in the first information processing apparatus.

In the information processing system and the method of processing information in an embodiment, the first information processing apparatus usable by the user and the second information processing apparatus communicate with each other. Specifically, the first information processing apparatus processes at least part of history information representing a history of a plurality of contents which have been operated in the past by the user, according to a predetermined rule, and transmits the processed history information to the second information processing apparatus. The second information processing apparatus receives the processed history information, determines one or more candidates for contents to be recommended to the user based on the processed history information, and generates a list of information which identifies each of the one or more candidates for contents. The generated list is transmitted from the second information processing apparatus to the first information processing apparatus.

According to the present invention in an embodiment, there is further provided an information processing apparatus including a memory unit for storing history information representing a history of a plurality of contents which have been operated in the past by the user, a processing unit for processing at least part of the history information stored in the memory unit according to a predetermined rule, and outputting processed history information, and a communicating unit for transmitting the processed history information output from the processing unit to another information processing apparatus.

When the other information processing apparatus determines one or more candidates for contents to be recommended to the user based on the processed history information transmitted from the communicating unit, generates a list of information which identifies each of the one or more determined candidates for contents, and transmits the list to the information processing apparatus, the communicating unit may receive the list transmitted from the other information processing apparatus, and the information processing apparatus may further include a determining unit for determining a content to be recommended to the user from among the one or more determined candidates for contents identified by the information on the list received by the communicating unit, based on the history information stored in the memory unit.

In the information processing apparatus in an embodiment, history information representing a history of a plurality of contents which have been operated in the past by the user is stored, and at last part of the history information is processed according to a predetermined rule, and the processed history information is transmitted to the other information processing apparatus.

According to the present invention in an embodiment, there is also provided a method of processing information in an information processing apparatus having a memory unit for storing history information representing a history of a plurality of contents which have been operated in the past by the user and a communicating unit for communicating with another information processing apparatus, the method including the steps of processing at least part of the history information stored in the memory unit according to a predetermined rule, and outputting the processed history information, and transmitting the output processed history information from the communicating unit to the other information processing apparatus.

According to the present invention in an embodiment, there is further provided a program for being executed by a computer for controlling a client having a memory unit for storing history information representing a history of a plurality of contents which have been operated in the past by the user and a communicating unit for communicating with a server, the program including the steps of processing at least part of the history information stored in the memory unit according to a predetermined rule, and outputting the processed history information, and transmitting the output processed history information from the communicating unit to the server.

In the method of processing information and the program in an embodiment, the information processing apparatus, or a client, having the memory unit for storing history information representing a history of a plurality of contents which have been operated in the past by the user and the communicating unit for communicating with another information processing apparatus, serves as an object to be processed. Specifically, at least part of the history information stored in the memory unit is processed according to a predetermined rule, and the processed history information is transmitted to the other information processing apparatus.

According to the present invention in an embodiment, a user profile can be transmitted to a server. In particular, a user profile can be transmitted confidentially to a server with a simple operation.

Additional features and advantages of the present invention are described in, and will be apparent from, the following Detailed Description of the Invention and the figures.

DETAILED DESCRIPTION OF THE INVENTION

Figure 1:
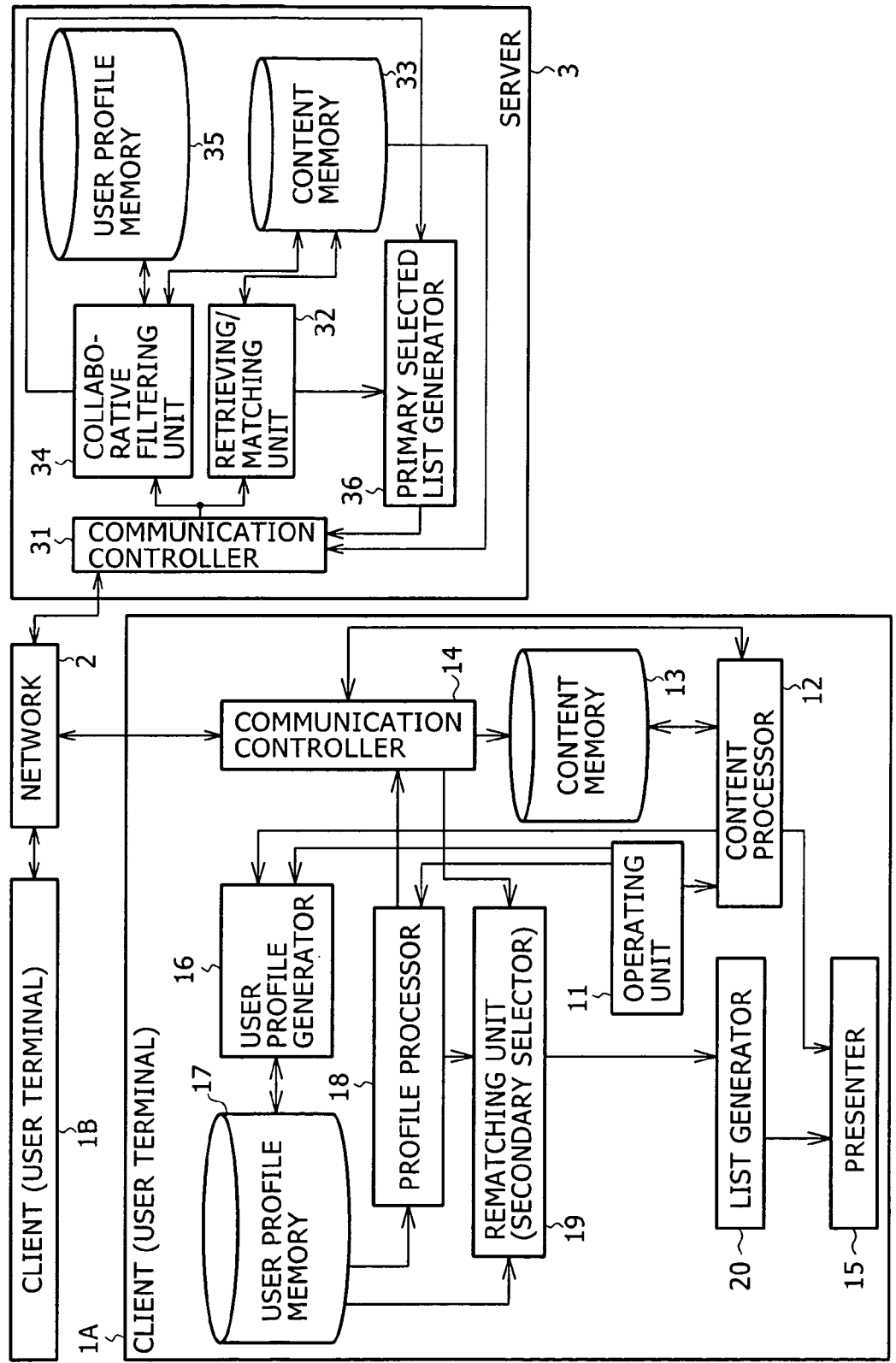
FIG. 1 is a block diagram of a functional arrangement of an information processing system according to an embodiment of the present invention.

The present invention relates to an information processing system and method, an information processing apparatus and method, and a program, and more particularly to an information processing system and method, an information processing apparatus and method, and a program which are capable of transmitting a user profile confidentially to a server with a simple operation.

According to the present invention in an embodiment, there is provided an information processing system. The information processing system includes a first information processing apparatus (for example, a client (user terminal) 1A shown in FIG. 1) usable by a user, and a second information processing apparatus (for example, a server 3 shown in FIG. 1), the first information processing apparatus and the second information processing apparatus being capable of communicating with each other, the first information processing apparatus including a memory unit (for example, a user profile memory 17 shown in FIG. 1) for storing history information (which will be referred to as a user profile as described later in the present specification) representing a history of a plurality of contents which have been operated in the past by the user, a processing unit (for example, a profile processor 18 shown in FIG. 1) for processing at least part of the history information stored in the memory unit according to a predetermined rule (which will be referred to as a processing rule in the present specification, and three examples thereof will be described later), and outputting processed history information (which will be referred to as a processed user profile), and a first communicating unit (for example, a communication controller 14 shown in FIG. 1) for transmitting the processed history information output from the processing unit to the second information processing apparatus, the second information processing apparatus including a second communicating unit (for example, a communication controller 31 shown in FIG. 1) for receiving the processed history information transmitted from the first information processing apparatus, a determining unit (for example, a retrieving/matching unit 32 and a collaborative filtering unit 34 shown in FIG. 1) for determining one or more candidates for contents to be recommended to the user based on the processed history information received by the second communicating unit, and a list generating unit (for example, a primary selected list generator 36 shown in FIG. 1) for generating a list (which will be referred to as a server recommendation list in the present specification) of information which identifies each of the one or more candidates for contents which are determined by the determining unit, wherein the second communicating unit transmits the list generated by the list generating unit to the first information processing apparatus, and the first communicating unit receives the list transmitted from the second information processing apparatus.

According to the present invention in an embodiment, there is also provided a method of processing information in an information processing system. The method of processing information is performed in the information processing system which includes a first information processing apparatus (for example, a client (user terminal) 1A shown in FIG. 1) usable by a user and a second information processing apparatus (for example, a server 3 shown in FIG. 1), the first information processing apparatus and the second information processing apparatus being capable of communicating with each other, the method including the steps of processing at least part of history information representing a history of a plurality of contents which have been operated in the past by the user, according to a predetermined rule in the first information processing apparatus, outputting the processed history information (for example, executing step S1 shown in FIG. 2), and transmitting the output processed history information from the first information processing apparatus to the second information processing apparatus (for example, executing step S2 shown in FIG. 2), receiving the processed history information from the first information processing apparatus in the second information processing apparatus (for example, executing step S21 shown in FIG. 2), determining one or more candidates for contents to be recommended to the user based on the processed history information in the second information processing apparatus (for example, executing step S22 shown in FIG. 2), generating a list of information which identifies each of the one or more candidates for contents in the second information processing apparatus (for example, executing step S23 shown in FIG. 2), and transmitting the generated list from the second information processing apparatus to the first information processing apparatus (for example, executing step S24 shown in FIG. 2), and receiving the list from the second information processing apparatus in the first information processing apparatus (for example, executing step S3 shown in FIG. 2).

According to the present invention in an embodiment, there is further provided an information processing apparatus. The information processing apparatus (for example, a client (user terminal) 1A shown in FIG. 1) includes a memory unit (for example, a user profile memory 17 shown in FIG. 1) for storing history information representing a history of a plurality of contents which have been operated in the past by the user, a processing unit (for example, a profile processor 18 shown in FIG. 1) for processing at least part of the history information stored in the memory unit according to a predetermined rule, and outputting processed history information, and a communicating unit (for example, a communication controller 14 shown in FIG. 1) for transmitting the processed history information output from the processing unit to another information processing apparatus (for example, a server 3 shown in FIG. 1).

When the other information processing apparatus determines one or more candidates for contents to be recommended to the user based on the processed history information transmitted from the communicating unit, generates a list of information which identifies each of the one or more determined candidates for contents, and transmits the list to the information processing apparatus, the communicating unit may receive the list transmitted from the other information processing apparatus, and the information processing apparatus may further include a determining unit (for example, a rematching unit (secondary selector) 19 shown in FIG. 1) for determining content to be recommended to the user from among the one or more determined candidates for contents identified by the information on the list received by the communicating unit, based on the history information stored in the memory unit.

According to the present invention in an embodiment, there is also provided a method of processing information. The method of processing information is performed in an information processing apparatus (for example, a client (user terminal) 1A shown in FIG. 1) having a memory unit (for example, a user profile memory 17 shown in FIG. 1) for storing history information representing a history of a plurality of contents which have been operated in the past by the user and a communicating unit (for example, a communication controller 14 shown in FIG. 1) for communicating with another information processing apparatus, the method including the steps of processing at least part of the history information stored in the memory unit according to a predetermined rule, and outputting the processed history information (for example, executing step S1 shown in FIG. 2), and transmitting the output processed history information from the communicating unit to the other information processing apparatus (for example, executing step S2 shown in FIG. 2).

According to the present invention in an embodiment, there is further provided a program. The program corresponds to the method of processing information that is performed in the information processing apparatus as described above. The program is executed by a personal computer shown in FIG. 3, for example.

An information processing system according to an embodiment of the present invention will be described below with reference to the drawings.

FIG. 1 shows in block form a functional arrangement of an information processing system according to the present invention.

As shown in FIG. 1, the information processing system includes a desired number of clients, e.g., two clients 1A, 1B, and a desired number of servers, e.g., a single server 3, which are connected to each other by a network 2.

Each of the clients is also referred to as a user terminal.

The network 2 is not limited to any particular configurations. For example, the network 2 may be the Internet or an Ethernet (registered trademark).

In the information processing system, each of the user terminals 1A, 1B can generate a user profile based on the content usage (operation) history of the user. The server 3 can perform various processing sequences using such a user profile. For example, the server 3 can retrieve or recommend contents that are determined as matching the preference of the user, from contents stored in the server 3, e.g., a content memory 33 to be described later. The server 3 may be controlled to use a user profile that has been processed according to given rules, rather than a user profile generated on the user side, e.g., the user terminal 1A or 1B. The term "processing" used here in relation to a user profile has a wide sense including not only the simple processing of contents of the user file, but also the generation (extraction) of information representing part of the user profile.

Functional details of the user terminals 1A, 1B and the server 3 will successively be described below individually in the order named.

The user terminal 1A has functional components ranging from an operating unit 11 to a list generator 20. Each of the functional components from the operating unit 11 to the list generator 20 may include a single piece of software, a single piece of hardware, or a combination thereof.

The operating unit 11 includes a keyboard, a mouse, and an input interface, for example. The user operates the operating unit 11 to enter various items of information into the user terminal 1A.

Specifically, the user can utilize the operating unit 11 to use desired contents. The operating unit 11 enters information corresponding various operations made by the user into a content processor 12, when then starts a processing sequence corresponding to the information. The processing sequence performed by the content processor 12 will be described later.

The user terminal 1A handles contents used by the user as data, i.e., as content data. The user terminal 1B and the server 3 also handle contents used by the user as content data.

The term "contents" used in the present specification represents a wide concept, generally called contents, covering all software or hardware that can be used by the user, including television broadcast programs, movies, photographs, music tunes (moving images, still images, sounds, or their combinations), documents, merchandise (including articles), conversations, and the like. If contents are articles (hardware), then data representing captured moving images, still images, and the like of those articles are used as content data thereof.

If contents and content data do not need to be distinguished from each other, then they are collectively referred to as contents. For illustrative purposes, moving images and corresponding sounds will be used as contents in the description which follows.

In the present specification, using contents means for the user to operate an information processing apparatus (the user terminal 1A or 1B in FIG. 1) to perform a certain processing sequence on the contents. Specifically, since it is assumed in the present description that contents are moving images and corresponding sounds, for example, entering an instruction from the user to record or reproduce a moving image and corresponding sound to enable the information processing apparatus to perform a processing sequence corresponding to the instruction is referred to as using contents (the moving image and corresponding sound).

Other than using contents in the manner as described above, the user may utilize the operating unit 11 to enter an instruction to present a list for selecting desired contents. The list enumerates identifiable items of information, e.g., titles or the like, of contents that are determined by the information processing apparatus (at least one of the user terminals 1A, 1B and the server 3 in FIG. 1) to be recommended for the user (hereinafter referred to as "recommended contents"). The list will hereinafter be referred to as "recommended content list".

As described in detail below, according to the present embodiment, recommended contents on a recommended content list are contents that are first selected by the server 3 and then further selected by the client 1A from the contents stored in the content memory 33 of the server 3.

When the user operates the operating unit 11 to enter an instruction to present a recommended content list, the operating unit 11 enters information corresponding to various operations of the user into a profile processor 18 or alternatively a user profile generator 16 as described later. The profile processor 18 or the user profile generator 16 then starts processing corresponding information. Processing sequences performed by the profile processor 18 and the user profile generator 16 will be described later.

The content processor 12 acquires contents distributed from the server 3 and received by a communication controller 14 via the network 2 or contents stored in a content memory 13, and perform various necessary processing sequences on the acquired contents for the user to use them based on operational details from the operating unit 11.

Specifically, since it is assumed in the present description that contents are moving images and corresponding sounds, for example, the user can operate the operating unit 11 to enter an instruction to reproduce desired contents. The content processor 12 acquires contents that it is instructed to reproduce from the content memory 13 or the server 3, processes the acquired contents, e.g., decodes compressed contents, and thereafter controls a presenter 15 to reproduce the contents. The presenter 15 displays a moving image as the contents and outputs sounds corresponding to the moving image.

The user can also operate the operating unit 11 to enter an instruction to record desired contents. When such an instruction is entered, the content processor 12 acquires contents that it is instructed to record from the server 3, processes the acquired contents, e.g., compresses the contents, and thereafter stores the processes contents in the content memory 13 as needed.

It is to be noted that the content processor 12 can acquire contents selected by itself from the server 3 without intervening the user's operation by the operating unit 11, and thereafter can store the processed contents in the content memory 13 as needed.

The content memory 13 stores one or more contents thus processed.

The communication controller 14 controls communications with another apparatus via the network 2. In FIG. 1, the other apparatus is primarily the server 3, but may include the user terminal 1B or an apparatus which is not shown.

The presenter 15 includes a display unit and a sound unit because it is assumed in the present description that contents are moving images and corresponding sounds, and presents various items of information to the user.

Specifically, the presenter 15 presents, i.e., reproduces, contents supplied from the content processor 12 to the user. That is, the presenter 15 presents contents to the user by displaying a moving image as the contents and outputting sounds corresponding to the moving image.

The presenter 15 also presents a recommended content list generated by a list generator 20 (detailed later) as an image to the user.

The user profile generator 16 generates information representative of a history of contents that the user have used in the past by operating the operating unit 11, i.e., a history of contents that have been processed in the past by the content processor 12, and stores the generated information as a user profile in a user profile memory 17. The information representative of a history of contents includes information about a history of contents used by the user and information generated based on such a history of contents, e.g., information about feature vectors, user preference vectors, etc.

User profiles are not limited to any particular information insofar as they are information representative of a history of contents used by the user. In the present embodiment, a user profile is a vector generated by the user profile generator 16 in the following fashion.

More specifically, the user profile generator 16 acquires metadata of used contents each time the user operates the operating unit 11 to use contents, i.e., each time the content processor 12 performs a corresponding processing sequence.

In the present specification, metadata indicate the following information. Contents referred to in the present specification include not only general contents, but also private documents, e.g., mail, of the user. Metadata represent a wide concept indicating not only general metadata such as program metadata or the like, but also information about contents themselves, i.e., contents according to a wide concept, or part thereof, or information in the form of words indicative of contents attributes or the like (numerical values are also considered to be information in the form of words). Stated otherwise, all information representing at least one feature of contents can be metadata.

However, since it is assumed in the present description that contents are moving images and corresponding sounds, such as television broadcast programs, general program metadata, i.e., EPG information serving as an electronic program guide, are used as metadata.

The types and number of metadata acquired by the user profile generator 16 are not limited. It is assumed in the present description that only information representing "category" is acquired as metadata.

Each time the user profile generator 16 acquires such metadata, i.e., information representative of categories, the user profile generator 16 sequentially stores the metadata in the user profile memory 17.

Alternatively, if the user profile memory 17 stores a list of values indicating how many times the user has used contents classified into corresponding categories, i.e., having metadata representing corresponding categories, the values being described at respective items of the categories (such a list will be referred to as "history list" in order to distinguish from the recommended content list), then the user profile generator 16 may perform the following process. When the user profile generator 16 acquires information (metadata) representing a certain category not registered in the history list for the first time, the user profile generator 16 adds an item of the category to the history list, and describes "1" as an initial value in the item. Subsequently, each time the user profile generator 16 acquires information (metadata) representing the certain category, the user profile generator 16 increments the value described in the item of the certain category by "1".

When a certain number of contents are used by the user, i.e., when a number of metadata are stored in the user profile memory 17, or when the value in each item on the history list exceeds a certain value, the user profile generator 16 generates the following vector. That is, a vector generated by the user profile generator 16 is a vector having components representing at least one of plural categories, with a weighted value of the corresponding category being put in each of the components.

A process of determining a weighted value of a category is not limited to any particular process. The process of determining a weighted value of a category may be a process of determining the number (frequency) of metadata representing a target category among all the metadata stored in the user profile memory 17, as a weighted value of the target category. Alternatively, the process of determining a weighted value of a category may be a process of determining the value (frequency) of the item of a target category on a history list stored in the user profile memory 17, as a weighted value of the target category.

It is assumed that one of the following two processes is employed. According to the first process, the ratio of the number of meta data representing a target category to a predetermined number, e.g., the total number of contents in the target category that were distributed in the past by the server 3, is determined as a weighted value of the target category. According to the second process, the ratio of the value of the item of a target category on a history list to a predetermined number, e.g., the total number of contents in the target category that were distributed in the past by the server 3, is determined as a weighted value of the target category.

Specifically, it is assumed that a vector whose components represent categories "drama", "news", "variety", and "music", for example, in the order named, i.e., a vector (drama, news, variety, music), is generated as a user profile. A vector with fixed categories represented by its respective components will hereinafter be referred to as "reference vector".

More specifically, it is assumed that 100 contents classified in each of the categories "drama", "news", "variety", and "music", for example, at present have already been distributed from the server 3.

It is assumed that the user A who is using the user terminal 1A has used 44 out of the 100 contents in the category "drama", 87 out of the 100 contents in the category "news", 11 out of the 100 contents in the category "variety", and 1 out of the 100 contents in the category "music". Specifically, it is assumed that the user profile memory 17 of the user terminal 1A stores 44 metadata representing "drama", 87 metadata representing "news", 11 metadata representing "variety", and 1 metadata representing "music". Alternatively, it is assumed that the user profile memory 17 of the user terminal 1A stores a history list, and 44 is described in the item "drama" on the history list, 87 is described in the item "news" on the history list, 11 is described in the item "variety" on the history list, and 1 is described in the item "music" on the history list.

It is also assumed that the user B who is using the user terminal 1B has used 67 out of the 100 contents in the category "drama", 24 out of the 100 contents in the category "news", 88 out of the 100 contents in the category "variety", and 74 out of the 100 contents in the category "music". Specifically, it is assumed that the user profile memory 17 (not shown) of the user terminal 1B stores 67 metadata representing "drama", 24 metadata representing "news", 88 metadata representing "variety", and 74 metadata representing "music". Alternatively, it is assumed that the user profile memory 17 of the user terminal 1B stores a history list, and 67 is described in the item "drama" on the history list, 24 is described in the item "news" on the history list, 88 is described in the item "variety" on the history list, and 74 is described in the item "music" on the history list.

In this case, the user profile generator 16 of the user terminal 1A generates a vector (drama, news, variety, music)=(0.44, 0.87, 0.11, 0.01) as a user profile of the user A, and the user profile generator 16 (not shown) of the user terminal 1B generates a vector (drama, news, variety, music)=(0.67, 0.24, 0.88, 0.74) as a user profile of the user B.

The timing for generating such reference vectors (user profiles) is not limited to any particular timings.

For example, as described above, the user can operate the operating unit 11 to enter an instruction for presenting a recommended content list. A reference vector (user profile) may be generated when the user enters such an instruction. The instruction for presenting a recommended content list is supplied from the operating unit 11 to the user profile generator 16.

Alternatively, a reference vector having components set to 0 may be stored as a user profile in the user profile memory 17, and each time the user uses contents, the user profile generator 16 may update the value of the target component in each of the components of the reference vector. According to this alternative, when an instruction for presenting a recommended content list is entered, the user profile has already been generated and stored in the user profile memory 17. Therefore, the instruction for presenting a recommended content list is supplied from the operating unit 11 to the profile processor 18.

According to the present embodiment, for simplifying explanation, it is assumed that a user profile (vector) is generated at the latter timing. That is, an instruction for presenting a recommended content list is supplied from the operating unit 11 to the profile processor 18.

When the profile processor 18 is supplied with an instruction for presenting a recommended content list from the operating unit 11, the profile processor 18 acquires the user profile (the vector described above) from the user profile memory 17, processes at least part of the user profile, and transmits resultant information (several vectors described later) to the server 3 via the communication controller 14 and the network 2.

The information produced by processing at least part of the user profile will hereinafter referred to as "processed user profile".

A processing method performed by the profile processor 18, i.e., a method of generating a processed user profile, (hereinafter referred to as "processing rule") is not limited to any particular processes. For example, the following three processing rules are available.

According to the first processing rule, item information about some of the items of a user profile is extracted, information is generated from the extracted item information about some of the items, and the generated information used as a processed user profile. Since the user profile is a vector, the components of the vector correspond to the respective items, and the component values of the respective components correspond to the item information.

Therefore, the first processing rule is a rule for extracting item information about some items of a user profile and transmitting information generated from the extracted item information about some items to the server 3, with the remaining item information being not transmitted to the server 3.

The extracted item information about some items of the user profile, i.e., the information generated from the item information about some items, which is transmitted to the server 3, may be item information about items that are specified by the server 3 or item information about predetermined items.

Specifically, in the above example, the user profile of the user A is represented by the vector (drama, news, variety, music)=(0.44, 0.87, 0.11, 0.01), and the user profile of the user B is represented by the vector (drama, news, variety, music)=(0.67, 0.24, 0.88, 0.74).

In the above example, the user A uses the user terminal 1A, and the user B uses the user terminal 1B.

According to the first processing rule, if only the component values of "drama" and "variety" are extracted, then the profile processor 18 of the user terminal 1A generates a vector "drama, variety"=(0.44, 0.11) from the user profile of the user A, and transmits the generated vector as a processed user profile of the user A to the server 3. The profile processor 18 (not shown) of the user terminal 1B generates a vector "drama, variety"=(0.67, 0.88) from the user profile of the user B, and transmits the generated vector as a processed user profile of the user B to the server 3.

The first one of the three processing rules that can be used by the profile processor 18 has been described above. The second processing rule will be described below.

According to the second processing rule, item information of at least some of the items of a user profile is processed, and resultant information (a vector described later) is used as a processed user profile. Since the user profile is a vector, the second processing rule processes all or some of the components of the vector, and uses a resultant vector as a processed user profile.

A method of processing item values (component values) is not limited to any particular methods, and may be a binarizing process, for example. According to a binarizing process, a threshold value, e.g., 0.5 or the like, is preset. If the component value of each of components of a target category is equal to or greater than the threshold value, then the component value is replaced with, i.e., processed into, 1, and if the component value of each of components of a target category is smaller than the threshold value, then the component value is replaced with, i.e., processed into, 0. The threshold value that is used is not limited to any particular threshold values, and may differ for each component or each category, or may be set to an identical value set based on the information held by the server 3, e.g., the distribution among categories of the number of distributed contents.

Specifically, in the above example, the user profile of the user A is represented by the vector (drama, news, variety, music)=(0.44, 0.87, 0.11, 0.01), and the user profile of the user B is represented by the vector (drama, news, variety, music)=(0.67, 0.24, 0.88, 0.74).

In the above example, the user A uses the user terminal 1A, and the user B uses the user terminal 1B.

According to the second processing rule, if the threshold value is 0.5, then the profile processor 18 of the user terminal 1A generates a vector "drama, news, variety, music"=(0, 1, 0, 0) from the user profile of the user A, and transmits the generated vector as a processed user profile of the user A to the server 3. On the other hand, the profile processor 18 of the user terminal 1B generates a vector "drama, news, variety, music"=(1, 0, 1, 1) from the user profile of the user B, and transmits the generated vector as a processed user profile of the user B to the server 3.

The second one of the three processing rules that can be used by the profile processor 18 has been described above. The third processing rule will be described below.

According to the third processing rule, information is generated from higher-level item information, e.g., up to second item information, of the item information of the items of a user profile, and the generated information is used as a processed user profile.

The higher-level item information may be used as it is, or at least part of the higher-level item information may be used. Stated otherwise, if the higher-level item information is used as it is, then the third processing rule is one form of the first processing rule, and if at least part of the higher-level item information is used, then the third processing rule is a combination of the first processing rule and the second processing rule.

Specifically, in the above example, the user profile of the user A is represented by the vector (drama, news, variety, music)=(0.44, 0.87, 0.11, 0.01), and the user profile of the user B is represented by the vector (drama, news, variety, music)=(0.67, 0.24, 0.88, 0.74).

In the above example, the user A uses the user terminal 1A, and the user B uses the user terminal 1B.

According to the third processing rule, the profile processor 18 of the user terminal 1A generates a vector "drama, news"=(0.44, 0.87) or (0, 1) (if the threshold value is 0.5) from the user profile of the user A, and transmits the generated vector as a processed user profile to the server 3. On the other hand, the profile processor 18 of the user terminal 1B generates a vector "variety, music"=(0.88, 0.74) or (1, 1) (if the threshold value is 0.5) from the user profile of the user B, and transmits the generated vector as a processed user profile to the server 3.

The three processing rules that can be used by the profile processor 18 has been described above.

As described above, the processing rule that can be used by the profile processor 18 is not limited to the above three processing rules.

The profile processor 18 is not required to use fixed one processing rule, but may determine and use one of a plurality of processing rules each time the profile processor 18 is to process a user profile. A process of determining one of a plurality of processing rules is not limited to any particular processes. For example, the user may operate the operating unit 11 to select a desired processing rule. Alternatively, the user terminal 1A may select a processing rule on its own. The latter process is capable of keeping details of a user profile secret at a higher level for protection against the side of the server 3. When the user terminal 1A selects a processing rule on its own, it may select a processing rule according to a given algorithm or may randomly select a processing rule based on random numbers.

In the above example, the timing (trigger) for the profile processor 18 to start processing a user profile occurs when an instruction to present a recommended content list is supplied from the operating unit 11. However, the profile processor 18 may start processing a user profile at any time. For example, the profile processor 18 may start processing a user profile each time a certain period of time elapses. In this case, each time a certain period of time elapses, a recommended content list is generated and presented to the user.

A processed user profile that is generated by the profile processor 18 according to a certain processing rule is transmitted to the server 3 via the communication controller 14 and the network 2 as described above.

Since a user profile that is private information of the user is processed by the profile processor 18 according to a certain processing rule, it is processed without troubling the user, i.e., without requiring the user to perform unwanted operations. Though a user profile itself has heretofore been transmitted to the server, a processed user profile is transmitted to the server 3 according to the present embodiment. Consequently, it is possible to keep details of the user profile secret for protection against the side of the server 3, e.g., a service provider who runs the server 3.

Even a processed user profile represents information indicative of a history of contents that have been operated in the past by the user. Therefore, the server 3 can generate personalized user information, and can distribute information efficiently in the form of recommended contents or a server recommendation list of recommended contents, for example. Since a processed user profile contains less data than the original user profile, i.e., the user profile before it is processed, the server 3 is capable of performing its processing more rapidly than the conventional server which uses original user profiles. If the user profiles of a number of users need to be accumulated for collaborative filtering, then processed user profiles may be accumulated in a less quantity than original user profiles. Stated otherwise, if the same storage capacity is available for user profiles, then more processed user profiles can be accumulated than original user profiles.

As described in detail later, when the server 3 receives a processed user profile, the server 3 determines one or more candidates for recommended contents by performing a retrieving process and a matching process using the processed user profile. Then, the server 3 generates, as a server recommendation list, a list of information (metadata or the like) that can identify such one or more candidates for recommended contents and information related to those candidates, and transmits the generated list via the network 2 to the user terminal 1A.

The communication controller 14 receives the server recommendation list and supplies the server recommendation list to a rematching unit 19.

The rematching unit 19 performs a retrieving processing and a matching processing using the supplied server recommendation list and the user profile stored in the user profile memory 17, thereby determining one or more recommended contents, and transmits the determined one or more recommended contents to the list generator 20. Stated otherwise, the rematching unit 19 selects contents using the user profile prior to being processed, from the candidates for recommended contents that have been selected by the server 3 using the processed user profile, and determines the selected contents as final recommended contents. As indicated in parentheses in FIG. 1, the rematching unit 19 can also be referred to as "secondary selector 19".

The list generator 20 generates a list of information (metadata including titles and locations or the like) that can identify one or more recommended contents determined by the rematching unit 19 or information related to those recommended contents, as a recommended content list. Then, the list generator 20 controls the presenter 15 to display the recommended content list as an image, i.e., present the recommended content list as an image to the user.

The functional arrangement of the user terminal 1A has been described above.

The user terminal 1B is not necessarily required to have the same functional arrangement as the user terminal 1A from the perspective of the user terminal 1A. However, from the perspective of the server 3, it is preferable for the user terminal 1B to have the same functional arrangement as the user terminal 1A. This is because the server 3 does not use utilize profiles in different formats for different users, but utilizes user profiles (processed) in a unified format and hence efficiently processes user information.

A functional arrangement of the server 3 will be described below.

The server 3 has functional components ranging from a communication controller 31 to a primary selected list generator 36. Each of the functional components from the communication controller 31 to the primary selected list generator 36 may include a single piece of software, a single piece of hardware, or a combination thereof.

The communication controller 31 controls communications with another apparatus via the network 2. In FIG. 1, the other apparatus includes the user terminals 1A, 1B and an apparatus which is not shown.

For example, the communication controller 31 receives a processed user profile transmitted from the user terminal 1A or 1B via the network 2, and supplies the processed user profile to a retrieving/matching unit 32 and a collaborative filtering unit 34.

The communication controller 31 also transmits a server recommendation list generated by the primary selected list generator 36, and contents specified by the user terminal 1A or 1B among the contents stored in the content memory 33, to the user terminal 1A or 1B via the network 2.

The retrieving/matching unit 32 performs a retrieving process and a matching process on the contents stored in the content memory 33, using the supplied processed user profile, to determine one or more candidates for recommended contents from the contents stored in the content memory 33, and transmits the determined one or more candidates to the primary selected list generator 36. That is, the retrieving/matching unit 32 performs a primary selection process using the supplied processed user profile to determine candidates for recommended contents, and transmits the results of the primary selection process, i.e., contents selected as candidates for recommended contents, to the primary selected list generator 36.

Each time the collaborative filtering unit 34 acquires a processed user profile transmitted from the user terminal 1A or 1B or another user terminal (not shown), the collaborative filtering unit 34 stores the acquired processed user profile in a user profile memory 35.

If the non-illustrated other user terminal is a conventional terminal (to which the present invention is not applied), it may transmit a user profile that is not processed. For the sake of brevity, it is assumed in the present embodiment that processed user profiles are transmitted from all user terminals including the user terminals 1A, 1B.

The user profile memory 35 accumulates or stores respective processed user profiles of a plurality of users. Since a processed user profile often contains less data than the original user profile, as described above, the user profile memory 35 can accumulate user profiles (processed user profiles) of more users with a smaller storage capacity than conventional user profile memories.

The collaborative filtering unit 34 selects a processed user profile that is identical or similar to the processed user profile of a present target user from among the processed user profiles already stored in the user profile memory 35.

The collaborative filtering unit 34 then performs a retrieving process and a matching process on the contents stored in the content memory 33, using the selected processed user profile from the user profile memory 35, thereby determining one or more candidates for recommended contents from the contents stored in the content memory 33. The collaborative filtering unit 34 transmits the determined one or more candidates for recommended contents to the primary selected list generator 36. That is, the collaborative filtering unit 34 performs a primary selection process using the selected processed user profile, or stated otherwise, the processed user profile of a user whose preference is identical or similar to the preference of the present target user, determining candidates for recommended contents, and transmits the results of the primary selection process, i.e., contents selected as candidates for recommended contents, to primary selected list generator 36.

Because the retrieving/matching unit 32 and the collaborative filtering unit 34 can perform various processes using processed user profiles, the amount of processing operation which the retrieving/matching unit 32 and the collaborative filtering unit 34 perform is smaller than if they would perform processes using user profiles prior to being processed. Therefore, the server 3 having the retrieving/matching unit 32 and the collaborative filtering unit 34 can perform various processes more quickly than conventional servers.

When one or more candidates for recommended contents are determined by the retrieving/matching unit 32 or the collaborative filtering unit 34 and transmitted to the primary selected list generator 36, the primary selected list generator 36 generates a server recommendation list as described above, and transmits the generated server recommendation list to the user terminal 1A or 1B via the communication controller 31 and the network 2.

The functional arrangement of the server 3 has been described above.

A process required for presenting a list of recommended contents to the user (hereinafter referred to as "recommended contents determining process"), which is part of the processing sequence performed by the user terminal 1A shown in FIG. 1, will be described below with reference to a left flowchart section of FIG. 2. A process performed by the server 3, which corresponds to the recommended content determining process performed by the user terminal 1A, will also be described below with reference to a right flowchart section of FIG. 2. The left flowchart section of FIG. 2 represents the recommended content determining process performed by the user terminal 1A, and the right flowchart section of FIG. 2 represents the corresponding process performed by the server 3.

Figure 2:
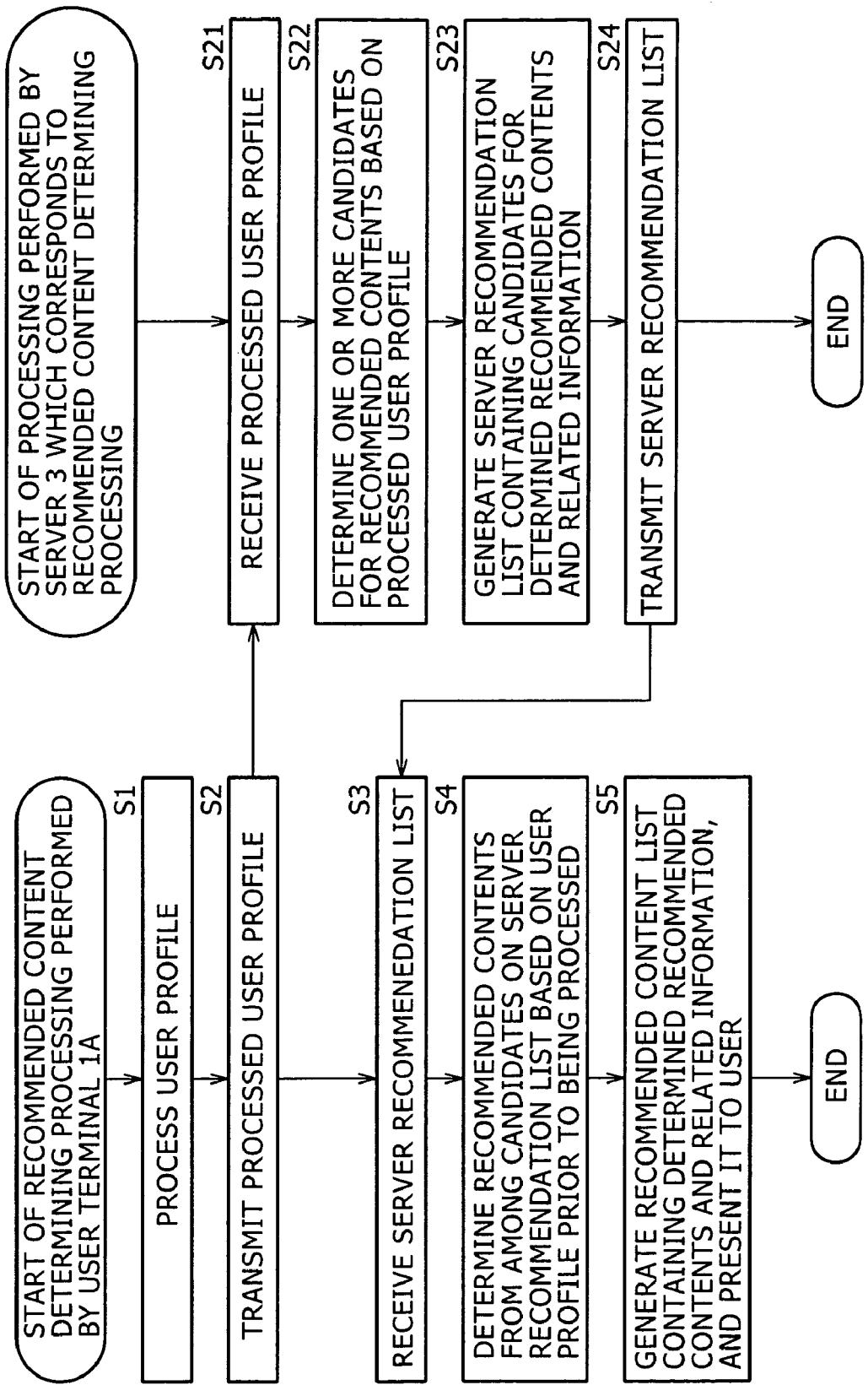
FIG. 2 is a flowchart of a recommended content determining process that is performed by a user device of the information processing system and a process that is performed by a server of the information processing system in response to the recommended content determining process.

Arrows directed from the left flowchart section to the right flowchart section and vise versa in FIG. 2 represent flows of given information.

As described above, in the present embodiment, an instruction to present a recommended content list is supplied from the operating unit 11 to the profile processor 18. Therefore, it is premised in the flowchart of FIG. 2 that a user profile is already stored in the user profile memory 17.

When an instruction to present a recommended content list is supplied from the operating unit 11 to the profile processor 18, or at any timing determined by the profile processor 18 itself, the user terminal 1A starts performing the recommended content determining process.

In step S1, the profile processor 18 processes a user profile stored in the user profile memory 17 according to a certain processing rule, e.g., one of the three processing rules described above, and supplies the processed user profile to the communication controller 14. The term "processing" used here in relation to a user profile covers processing of item information (the component values of a vector in the present embodiment) of the user profile, and a process of selecting some of the terms of the user profile and generating information (a vector with its dimension reduced in the present embodiment) from the selected items.

In step S2, the communication controller 14 transmits the processed user profile through the network 2 to the server 3.

In step S21, the communication controller 31 of the server 3 receives the processed user profile and supplies the received processed user profile to the retrieving/matching unit 32 and the collaborative filtering unit 34.

In step S22, either one of the retrieving/matching unit 32 and the collaborative filtering unit 34 determines one or more candidates for recommended contents from among the contents stored in the content memory 33 based on the supplied processed user profile, and transmits the determined one or more candidates for recommended contents to the primary selected list generator 36. Therefore, the primary selection process for selecting recommended contents is performed in step S22.

In step S23, the primary selected list generator 36 generates a server recommendation list including the one or more candidates for recommended contents determined in step S22 and information related to the candidates, and supplies the generated server recommendation list to the communication controller 31.

The server recommendation list contains, more precisely, information (metadata or the like) that can identify such one or more candidates for recommended contents and information related to those candidates. However, the server recommendation list may contain candidates for recommended contents and information related to those candidates themselves.

In step S24, the communication controller 31 transmits the supplied server recommendation list through the network 2 to the user terminal 1A. The process performed by the server 3 is now put to an end.

In step S3, the communication controller 14 of the user terminal 1A receives the server recommendation list, and supplies the received server recommendation list to the rematching unit 19.

In step S4, the rematching unit 19 determines one or more recommended contents from among the server recommendation list based on the user profile prior to being processed that is stored in the user profile memory 17, and transmits the determined one or more recommended contents to the list generator 20. Therefore, the secondary selection process for selecting recommended contents is performed in step S4.

In step S5, the list generator 20 generates a recommended content list containing the one or more recommended contents determined in step S4 and information related to the recommended contents, and controls the presenter 15 to present the recommended content list to the user.

The recommended content list contains, more precisely, information (metadata or the like) that can identify such recommended contents and information related to those recommended contents. The presenter 15 displays, as an image, a list of all or some of the metal data (titles and locations or the like) of the one or more recommended contents.

The recommended content list may contain recommended contents and information related to those recommended contents themselves. If the recommended content list contains one or more recommended contents themselves, then the presenter 15 presents the recommended contents to the user by successively reproducing at least part (including thumbnail still images) of the one or more recommended contents.

The recommended contents determining process performed by the user terminal 1A is now put to an end.

Steps S4, S5 may be dispensed with, and the step of presenting the server recommendation list (the list from the primary selection process) received in step S3 to the user may be added after step S3. According to this modification, an operation to gain access to the list from the primary selection process, i.e., a request for acquiring contents or a browsing of related information, may be reflected in the user profile stored in the user profile memory 17. That is, the user profile may be updated based on the details of the operation or the details of the operation may be added as item information to the user profile. A history of such operations is not transmitted as it is to the server 3, but needs to be processed by the profile processor 18 if it is to be transmitted to the server 3.

The processes of the user terminal 1A and the server 3 has been described above. If the user terminal 1B and other terminals have the same functional arrangement as the user terminal 1A, then they can perform the same process as the user terminal 1A according to the left flowchart section of FIG. 2, and the server 3 can perform a corresponding process according to the right flowchart section of FIG. 2.

The above processing sequence may be performed by either hardware or software.

Figure 3:
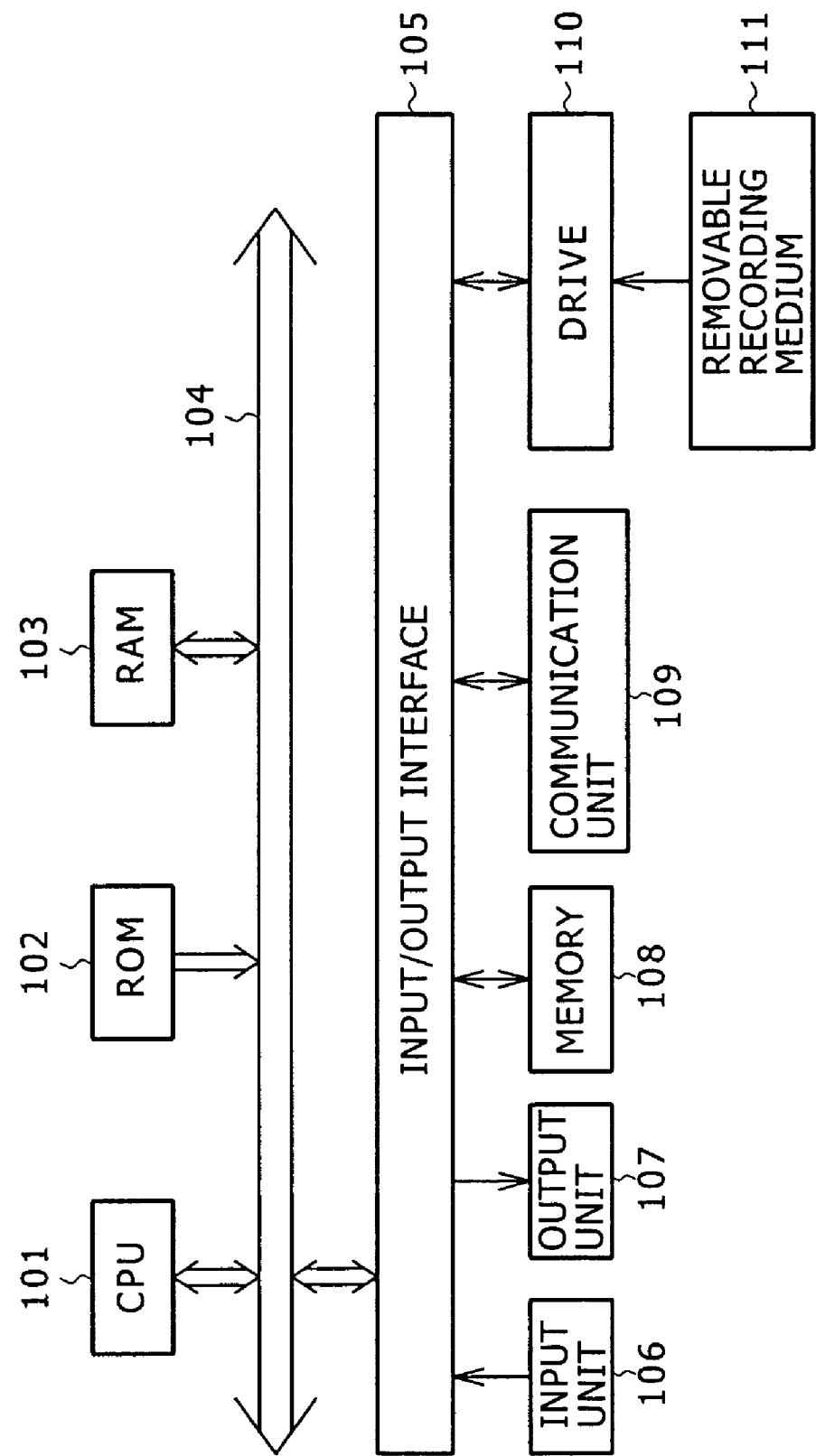
FIG. 3 is a block diagram of a hardware arrangement of an information processing apparatus, e.g., the user device or the server, according to an embodiment of the present invention.

If the processing sequence is performed by software, then each of the user terminals 1A, 1B and the server 3 shown in FIG. 1 may include a personal computer as shown in FIG. 3.

As shown in FIG. 3, a CPU (Central Processing Unit) 101 performs various processes according to a program recorded in a ROM (Read Only Memory) 102 or a program loaded from a memory 108 into a RAM (Random Access Memory) 103. The RAM 103 also stores data required for the CPU 101 to perform the various processes.

The CPU 101, the ROM 102, and the RAM 103 are connected to each other by a bus 104. An input/output interface 105 is connected to the bus 104.

To the input/output interface 105, there are connected an input unit 106 including a keyboard, a mouse, etc., an output unit 107 including a display unit or the like, the memory 108 including a hard disk or the like, and a communication unit 109 including a modem, a terminal adapter, or the like. The communication unit 109 performs communications with another information processing apparatus, e.g., the server 3 from the perspective of the user terminal 1A or the user terminal 1A or 1B from the perspective of the server 3, via a network, e.g., the network 2 shown in FIG. 1, including the Internet.

A drive 110 is also connected to the input/output interface 105. A removable recording medium 111 such as a magnetic disk, an optical disk, a magneto-optical disk, or a semiconductor memory is mounted in the drive 110. A computer program that is read from the removable recording medium 111 by the drive 110 is installed in the memory 108.

If the processing sequence is to be performed by software, then a software program is installed from the network or the recording medium into a computer constructed as dedicated hardware or a general-purpose personal computer which is capable of performing various functions according to various installed programs.

The recording medium storing the program may include the removable recording medium (package mediums) 111, separate from the information processing apparatus itself, such as a magnetic disk (including a floppy disk), an optical disk (including a CD-ROM (Compact Disk-Read Only memory) and a DVD (Digital Versatile Disk)), a magneto-optical disk (including a MD (Mini-Disk), or a semiconductor memory, which stores the program and is distributed to provide the program to the user, or the ROM 102 which stores the program and is incorporated in the information processing apparatus, or a hard disk included in the memory 108.

In the present specification, the steps that are descriptive of the program recorded in the recording medium include not only processing details that are carried out chronologically in the order of the steps, but also processing details that are carried out parallel or individually, rather than chronologically.

The term "system" used in the present specification represents an overall assembly made of a plurality of apparatus and processors.

Although a certain preferred embodiment of the present invention has been shown and described in detail, it should be understood that various changes and modifications may be made therein without departing from the scope of the appended claims.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An information processing system comprising:
a first information processing apparatus usable by a user; and
a second information processing apparatus, said first information processing apparatus and said second information processing apparatus being capable of communicating with each other;
said first information processing apparatus including:
a memory unit for storing history information representing a history of a plurality of contents which have been past operated by the user;
a processing unit for processing at least part of said history information stored in said memory unit according to a predetermined rule, and outputting processed history information; and
a first communicating unit for transmitting said processed history information output from said processing unit to said second information processing apparatus;
said second information processing apparatus including:
a second communicating unit for receiving said processed history information transmitted from said first information processing apparatus;
a determining unit for determining one or more candidates for contents to be recommended to the user based on said processed history information received by said second communicating unit; and
a list generating unit for generating a list of information which identifies each of said one or more candidates for contents which are determined by said determining unit;
wherein said second communicating unit transmits said list generated by said list generating unit to said first information processing apparatus, and said first communicating unit receives said list transmitted from said second information processing apparatus.
wherein said predetermined rule is selected by the user or automatically selected, and said predetermined rule uses at least one a simple processing of contents of a user file and a generation of information representing part of the user profile.

2. The information processing system of claim 1, wherein the processed history information is a vector.

3. A method of processing information in an information processing system including a first information processing apparatus usable by a user and a second information processing apparatus, said first information processing apparatus and said second information processing apparatus being capable of communicating with each other, said method comprising:

processing at least part of history information representing a history of a plurality of contents which have been past operated by the user, according to a predetermined rule in said first information processing apparatus, and transmitting said processed history information from said first information processing apparatus to said second information processing apparatus;
wherein said predetermined rule is selected by the user or automatically selected, and said predetermined rule uses at least one of a simple processing of contents of a user file and a generation of information representing part of the user profile;
receiving said processed history information from said first information processing apparatus in said second information processing apparatus, determining one or more candidates for contents to be recommended to the user based on said processed history information in said second information processing apparatus, generating a list of information which identifies each of said one or more candidates for contents in said second information processing apparatus, and transmitting the generated list from said second information processing apparatus to said first information processing apparatus; and
receiving said list from said second information processing apparatus in said first information processing apparatus.

4. The method of claim 3, wherein the processed history information is a vector.

5. An information processing apparatus comprising:
a memory unit for storing history information representing a history of a plurality of contents which have been past operated by the user;
a processing unit for processing at least part of said history information stored in said memory unit according to a predetermined rule, and outputting processed history information;
wherein said predetermined rule is selected by the user or automatically selected, and said predetermined rule uses at least one of a simple processing of contents of a user file and a generation of information representing part of the user profile; and
a communicating unit for transmitting said processed history information output from said processing unit to another information processing apparatus.

6. The information processing apparatus according to claim 5, wherein when said other information processing apparatus determines one or more candidates for contents to be recommended to the user based on said processed history information transmitted from said communicating unit, generates a list of information which identifies each of said one or more determined candidates for contents, and transmits said list to said information processing apparatus, said communicating unit receives said list transmitted from said other information processing apparatus, said information processing apparatus further comprising a determining unit for determining contents to be recommended to the user from among said one or more determined candidates for contents identified by the information on said list received by said communicating unit, based on said history information stored in said memory unit.

7. The information processing apparatus of claim 5, wherein the processed history information is a vector.

8. A method of processing information in an information processing apparatus having a memory unit for storing history information representing a history of a plurality of contents which have been past operated by the user and a communicating unit for communicating with another information processing apparatus, said method comprising the steps of:

processing at least part of said history information stored in said memory unit according to a predetermined rule, and outputting said processed history information wherein said predetermined rule is selected by the user or automatically selected, and said predetermined rule uses at least one of a simple processing of contents of a user file and a generation of information representing part of the user profile; and transmitting said output processed history information from said communicating unit to said other information processing apparatus.

9. The method of claim 8, wherein the processed history information is a vector.

10. A program for being executed by a computer for controlling a client having a memory unit for storing history information representing a history of a plurality of contents which have been operated in the past by the user and a communicating unit for communicating with a server, said program comprising:

processing at least part of said history information stored in said memory unit according to a predetermined rule, and outputting said processed history information wherein said predetermined rule is selected by the user or automatically selected, and said predetermined rule uses at least one of a simple processing of contents of a user file and a generation of information representing part of the user profile; and transmitting said output processed history information from said communicating unit to said server.

11. The program for being executed by a computer of claim 10, wherein the processed history information is a vector.

* * * * *